US009729967B2

(12) United States Patent
Tahernezhadi

(10) Patent No.: US 9,729,967 B2
(45) Date of Patent: Aug. 8, 2017

(54) FEEDBACK CANCELING SYSTEM AND METHOD

(71) Applicant: BOARD OF TRUSTEES OF NORTHERN ILLINOIS UNIVERSITY, Dekalb, IL (US)

(72) Inventor: Mansour Tahernezhadi, Dekalb, IL (US)

(73) Assignee: Board of Trustees of Northern Illinois University, Dekalb, IL (US)

( * ) Notice: Subject to any disclaimer, the term of this patent is extended or adjusted under 35 U.S.C. 154(b) by 286 days.

(21) Appl. No.: 14/201,148

(22) Filed: Mar. 7, 2014

(65) Prior Publication Data

US 2014/0254825 A1 Sep. 11, 2014

Related U.S. Application Data

(60) Provisional application No. 61/775,184, filed on Mar. 8, 2013.

(51) Int. Cl.
*H04R 3/00* (2006.01)
*H04R 3/02* (2006.01)
*H04B 3/20* (2006.01)

(52) U.S. Cl.
CPC ..................................... *H04R 3/02* (2013.01)

(58) Field of Classification Search
CPC ...... H04R 3/02; H04R 3/005; H04R 2410/01; H04R 2410/05; H04R 25/407; G10L 21/0272; G10L 2021/02165; G10L 21/0208; G10L 2021/02161
USPC ............ 381/66, 83, 93, 92, 122, 94.1, 94.7; 704/226, 227, 233
See application file for complete search history.

(56) References Cited

U.S. PATENT DOCUMENTS

| | | | |
|---|---|---|---|
| 3,500,000 | A | 3/1970 | Kelly et al. |
| 6,022,220 | A | 2/2000 | Haugen |
| 6,954,530 | B2 | 10/2005 | Gunther |
| 6,968,064 | B1 | 11/2005 | Ning |

(Continued)

FOREIGN PATENT DOCUMENTS

WO WO 2009/023616 2/2009

OTHER PUBLICATIONS

Buchner et al., "A Generalization of Blind Source Separation Algorithms for Convolutive Mixtures Based on Second-Order Statistics," *IEEE Transactions on Audio, Speech, and Language Processing*, 13(1): 120-134 (Jan. 2005).

(Continued)

*Primary Examiner* — Vivian Chin
*Assistant Examiner* — Ammar Hamid
(74) *Attorney, Agent, or Firm* — Barnes & Thornburg LLP; Alice O. Martin

(57) ABSTRACT

Reducing feedback in an input signal that contains a signal component based on an output signal from a proximate output. The input signal is separated into a plurality of frequency bands by band pass filters. The power of signal in each band is determined, and the band signal with the greatest power is selected. That band's signal is sampled at a sampling rate, and at regular intervals one of the samples is selected. Blind signal separation is used to estimate signal sources from the selected samples. The estimated signals are compared to the output signal, and the estimated signal most similar to the output signal is subtracted from the input signal.

21 Claims, 9 Drawing Sheets

(56) References Cited

U.S. PATENT DOCUMENTS

| | | | | |
|---|---|---|---|---|
| 6,996,229 | B2 | 2/2006 | Gunther | |
| 7,764,783 | B1 | 7/2010 | Pai et al. | |
| 2005/0243995 | A1 | 11/2005 | Kang et al. | |
| 2006/0018459 | A1 | 1/2006 | McCree | |
| 2008/0118075 | A1 | 5/2008 | Benesty et al. | |
| 2009/0123002 | A1 | 5/2009 | Karthik et al. | |
| 2011/0002473 | A1* | 1/2011 | Nakatani | 381/66 |
| 2013/0294611 | A1* | 11/2013 | Yoo | G10L 21/028 381/66 |

OTHER PUBLICATIONS

Buchner et al., "Robust Extended Multidelay Filter and Double-Talk Detector for Acoustic Echo Cancellation," *IEEE Transactions on Audio, Speech, and Language Processing*, 14(5): 1633-1644 (Sep. 2006).

Cardoso, "High-Order Contrasts for Independent Component Analysis," *Neural Computation*, 11: 157-192 (1999).

Chen et al., W.A.V.S. Compression, accessed online at: www.aamusings.com/project-documentation/wavs/filterBank.html (Sep. 11, 2011).

De la Rosa et al., "Higher-order Cumulants for Termite's Activity Detection in the Time Domain," *IEEE Sensors Applications Symposium*, 1-6 (Feb. 2008).

Hong et al., "An adaptive echo cancellation method based on a blind signal separation," *IEEE 2010 International Conference on Electrical and Control Engineering*, 360-363 (2010).

Hyvärinen et al., "Independent Component Analysis: Algorithms and Applications," *Neural Networks*, 13(4-5): 411-430 (Jun. 2000).

Ikram, Blind Source Separation and Acoustic Echo Cancellation: A Unified Framework, *2012 IEEE International Conference on Acoustics, Speech and Signal Processing* (*ICASSP*), p. 1701-1704 (Mar. 2012).

Jiang et al., "Low-Complexity Independent Component Analysis Based Semi-Blind Receiver for Wireless Multiple-Input Multiple-Output Systems," *Int'l J. Design, Anal. and Tools for Circuits and Sys.*, 2(2):91-98 (2011).

"Joint Diagonalization," accessed online at: http://perso.telecom-paristech.fr/~cardoso/jointdiag.html (Feb. 3, 2012).

Karra, "Application of Blind Source Separation to Acoustic Echo Cancellation," Proquest, Graduate Thesis, Northern Illinois University, UMI 1513430 (2012).

Kumar et al., "A Novel Method for Blind Source Separation," *IJECT*, 2(4): 103-106 (2011).

Laska et al., "Improved Proportionate Subband NLMS for Acoustic Echo Cancellation in Changing Environments," *IEEE Signal Processing Letters*, 15: 337-340 (2008).

Lee et al., "Improving Convergence of the NLMS Algorithm Using Constrained Subband Updates," *IEEE Signal Processing Letters*, 11(9):736-739 (2004).

Lumburu, "Blind Source Separation Using A Subband-Based Jade Algorithm," Graduate Thesis, Northern Illinois University, *ProQuest*, UMI 1506311 (2011).

Merugu, "Development of Sub band based Blind Source Signal Separation," Graduate Thesis, Northern Illinois University, *ProQuest*, UMI 1488433 (2010).

Ngoc et al, "Application of Block On-LIneBlind Source Separation to Acoustic Echo Cancellation," *J. Acoustical Soc. Kor.*, 27(1E):17-24 (2008).

Ogale et al., "Design of an M-Channel Cosine Modulated Filter Bank by New Cosh Window Based Fir Filters," *World Acad. Sci., Engineer., & Tech.*, 4: 207-212 (2010).

Park et al., "Subband-based blind signal separation for noisy speech recognition," *Electronic Letters*, 35(23): 2011-2012 (1999).

Pedersen et al. "A survey of convolutive blind source separation methods." *Multichannel Speech Processing Handbook*, 1065-1084 (2007).

Sadkhan et al., "Performance evaluation of speech scrambling methods based on statistical approach." *Atti della Fondazione Giorgio Ronchi* 66(5): 601-614 (2011).

Sakai et at., "The Acoustic Echo Cancelation using Blind Source Separation to Reduce Double-talk Interference," *2012 Proceedings of SICE Annual Conference* (*SICE*), 731-734 (2012).

Souden et al., "Optimal Joint Linear Acoustic Echo Cancelation and Blind Source Separation in the Presence of Loudspeaker Nonlinearity," *2009 IEEE International Conference on Multimedia and Expo*, 117-120 (2009).

Tanaka et al., "Subband Decomposition Independent Component Analysis and New Performance Criteria," *IEEE International Conference on Acoustics, Speech, and Signal Processing*, (*ICASSP'04*), vol. 5: p. V-541 (2004).

Wada et al, "Acoustic Echo Cancellation Based on Independent Component Analysis and Integrated Residual Echo Enhancement," 2009 IEEE Workshop on Applications of Signal Processing to Audio and Acoustics, p. 205-208 (2009).

Wada et al., "Multi-Channel Acoustic Echo Cancellation Based on Residual Echo Enhancement With Effective Channel Decorrelation Via Resampling," *Proc. IWAENC.*, (2010).

Widrow et al., "On the Statistical Efficiency of the LMS Algorithm with Nonstationary Inputs," *IEEE Transactions on Information Theory*, 30(2): 211-221 (1984).

* cited by examiner

FEEDBACK CANCELING SYSTEM AND METHOD

This application claims priority from U.S. provisional application No. 61/775,184, filed Mar. 8, 2013, the content of which is herein incorporated by reference in its entirety.

BACKGROUND

The present disclosure relates to a system, components and methodologies for improved cancellation of feedback in a signaling environment having an output and an input, wherein a signal from the output is related to a signal received at the input as feedback. In particular, the present disclosure is directed to a system, components and methodologies that combine the estimation of a plurality of signal sources in an input signal, identification of one of the estimated sources most closely related to the output signal as a feedback signal, and cancellation of the feedback signal from the input signal. The estimation of a plurality of signal sources in the input is called blind signal separation (BSS) because it is performed with no foreknowledge of the real signals that may be combined to form the input signal. The identification and cancellation of the feedback signal from the input signal is called acoustic echo cancellation (AEC) because feedback can produce an echo in an audio signal, and the process cancels the echo. However, the process can be applied to any type of signal, not just signals related to acoustics, and can be used to eliminate any kind of feedback, not just echoes.

Various BSS and AEC methods have been developed in recent decades. In 1960, Bernard Widrow, a professor at Stanford University, and his Ph.D student Ted Hoff developed an algorithm called the Least Mean Square (LMS) algorithm, which is the principle behind echo cancellation. A disadvantage of LMS was that it used adaptive filters to process noisy signals, and the filters could not adapt quickly enough to be useful in real applications. E. Oja and Aapo Hyvarinen developed an algorithm called Fast Independent Component Analysis (Fast ICA) to perform so-called Blind Source Separation (BSS), which involves developing a mixing matrix that represents a plurality of estimated source signals. An advantage was that estimation of the source signals was performed on a set of mixed real signals with no foreknowledge of the signals that were mixed. However, Fast ICA cannot adapt its mixing matrix in a non-stationary environment, i.e., an environment in which various real source signals are starting and stopping, if the source signals change too rapidly. Instead, it requires the assumption that within a single processing frame, the mixing matrix should stay approximately constant. In 1999, J. F. Cardoso developed the so-called joint approximate diagonalization of eigen-matrices (JADE) algorithm for BSS, which also uses a mixing matrix. JADE gives better results than Fast ICA in cases where there are rapid variations in the mixing matrix. Its drawback is the relatively small number of source components that can be estimated from an input signal comprising a plurality of sources, making it inadequate for use in cases comprising a large number of input signal source components. Hence, the JADE algorithm is not very robust. BSS was reported combined with acoustic echo cancellation (AEC).

SUMMARY

Systems and methods for eliminating feedback in an input signal that contains a signal component based on an output signal from a proximate output are disclosed. The input signal is separated into a plurality of frequency bands by band pass filters. The power of signal in each band is determined, and the band signal with the greatest power is selected. That band's signal is sampled at a sampling rate, and at regular intervals one of the samples is selected. Blind signal separation is used to estimate signal sources from the selected samples. The estimated signals are compared to the output signal, and the estimated signal most similar to the output signal is subtracted from the input signal.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying FIGs. in which.

The FIGs and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The modern world abounds with signals of various types, and with systems that process those signals. The signals in a signaling environment may be sources of energy, such as streaming acoustic or electromagnetic signals, for example. Or, the signals may be particular sources of information, such as streaming transaction information from a stock market, for example. The systems that process signals often comprise an input that receives a streaming signal of some kind, operative elements that perform operations on the input signal and generate a streaming result signal of some kind, and an output that emits the streaming result signal. In many cases, the signal emitted at the output contributes a component of the signal received at the input. The contribution of the output signal received at the input is generally termed an echo, reverberation, or feedback signal (hereinafter collectively "feedback"). Very often, the feedback is undesirable, and resources may be devoted to suppressing or canceling the feedback signal from the input.

Figure 1A:
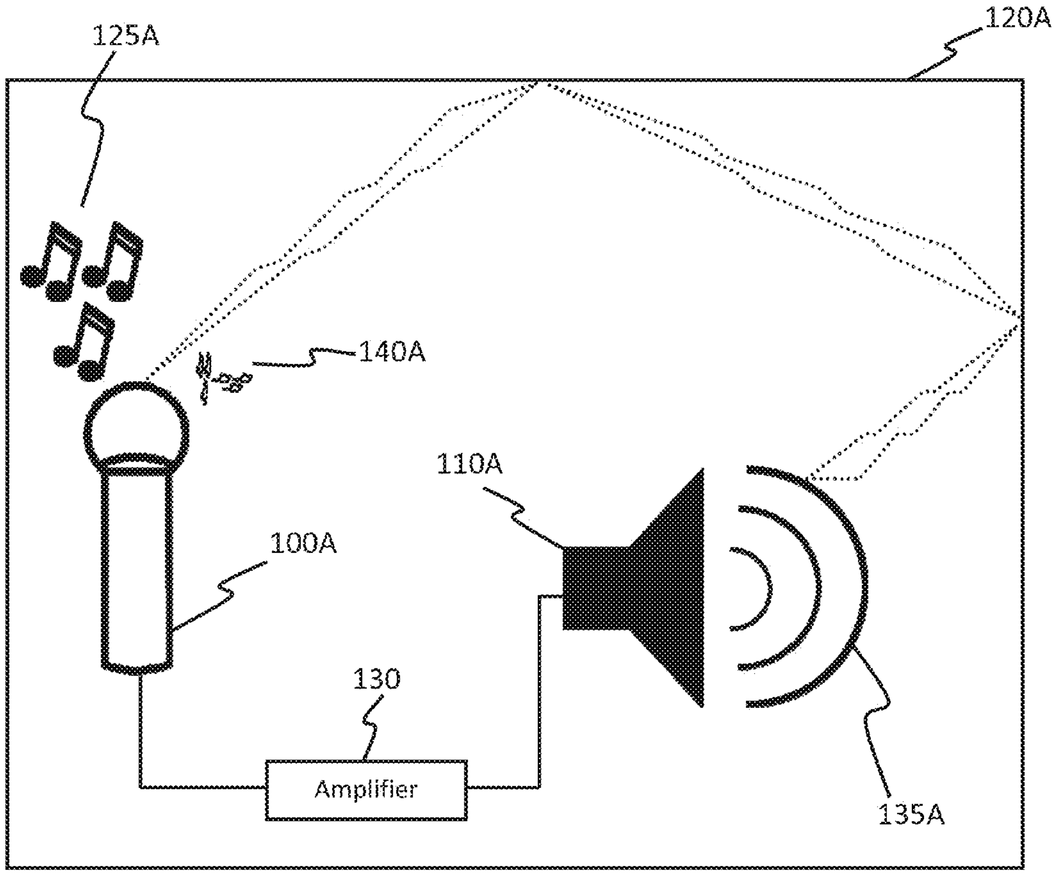
FIGS. 1A and 1B illustrate exemplary scenarios in which the herein disclosed systems and methods may be used.
Figure 1B:
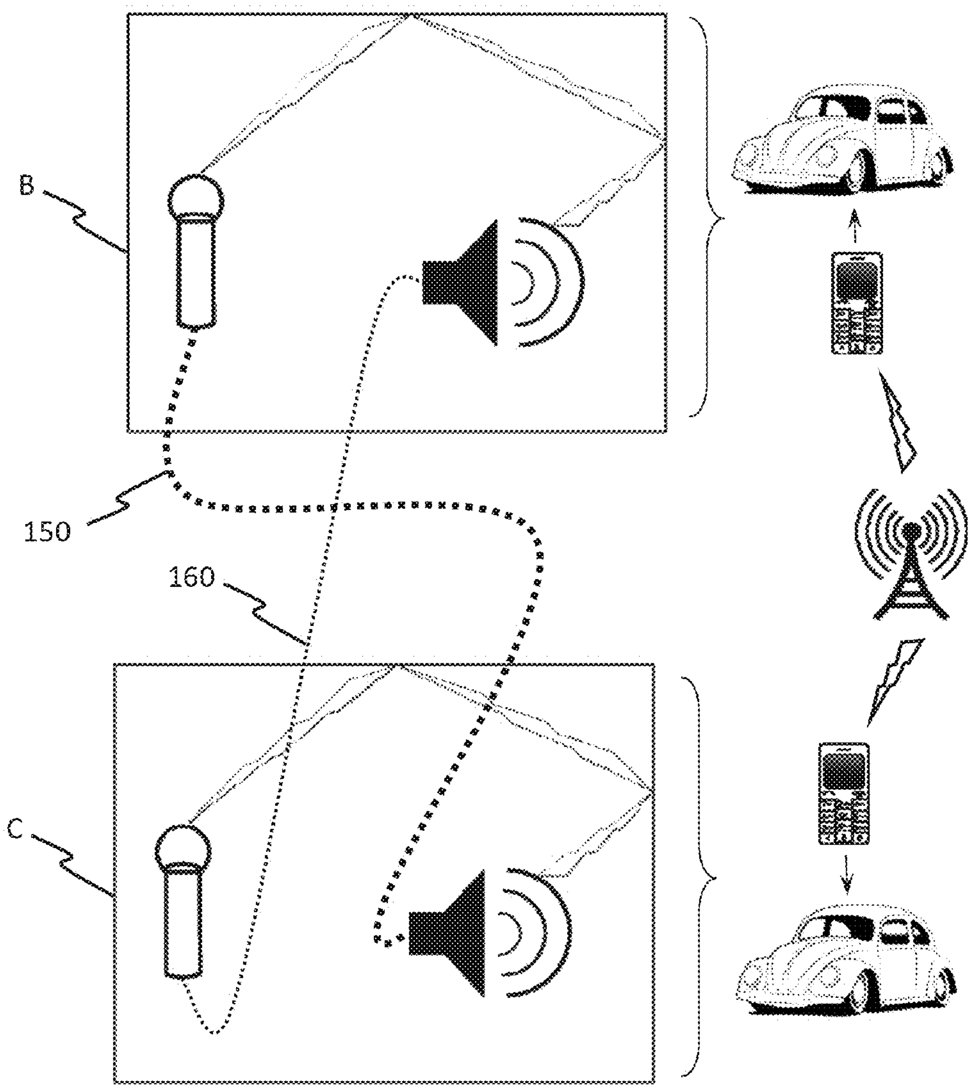

FIGS. 1A and 1B illustrate the feedback principle in representative scenarios. In FIG. 1A, microphone (mic) 100A and speaker 110A are situated in an enclosed space 120A. An exemplary scenario could be a band playing music in a concert hall. The mic picks up music 125A from the band as an input signal, converts it into an electrical signal which is amplified in amplifier 130 and sent to the speaker. The speaker converts the amplified electrical signal into an amplified sound signal 135A. The amplified sound signal bounces off of surfaces in the hall, such as the walls and ceiling, causing a reverberation signal (reverb) 140A at the mic. The mic picks up the reverb along with the original band music, and both are amplified, and output by the speaker. Depending on the acoustics of the room, the placement of the microphone and speaker, and the sounds produced by the band, the reverb signal may include a large component at the resonant frequency of the acoustical environment. If so, that resonant component will circulate through the environment most efficiently, eventually overwhelming the other sounds and producing a characteristic hum with increasing volume at the resonant frequency. That hum is itself sometimes referred to as feedback. Other acoustical systems in which a mic picks up a sound signal, amplifies it, outputs an amplified signal at a speaker that may be picked up again by the mic, are subject to similar feedback scenarios. One example is a hearing aid, which commonly has a mic in close proximity to a speaker and may produce an extremely annoying squeal in the wearer's ear. Accordingly, in such scenarios, it is desirable to cancel from the input signal the portion of the input signal that was caused by the feedback signal.

FIG. 1B is representative of a different type of feedback scenario. As shown, there are two sets of mic and speaker, each in a different enclosed environment. For simplicity, the environments will be referred to as B and C, and the components within them will be referred to as components B and C, for example, mic B, speaker B, mic C, speaker C, etc. As shown, the enclosed environment may be the inside of a vehicle such as a car, and the mic and speaker may be embodied in a cell phone placed inside the car. Mic B picks up sounds from inside the car, such as the driver speaking, converts it to an electromagnetic signal 150 and sends it to speaker C. In the sending, a delay of perhaps a couple tenths of a second is incurred between the time driver B talks and the time speaker C emits the talking, due to latency in the communication system that conveys signal 150 from B to C. Mic C picks up the talking emitted by speaker C, converts it to electromagnetic signal 160 and sends it to speaker B, incurring another delay of a couple tenths of a second before the same talking is emitted by speaker B. The result is a very distracting echo with a delay on the order of half a second, which is heard by driver B. A similar echo would be heard by driver C, in connection with his own talking. Accordingly, in such scenarios, it is desirable to cancel from the input signals at mics B and C the portion of their respective input signals that was caused by the respective echo signals.

Methods exist in the prior art that can effectively cancel these types of feedback. However, the methods are computationally intensive, and consequently require considerable processing power and correspondingly high power consumption to perform. Accordingly, such methods cannot be employed in devices in which computational capability and/or power consumption are strictly limited. Cell phones and hearing aids, as described in the foregoing, are two examples of just such limited devices, in scenarios where the signals are acoustic signals. However, the herein disclosed systems, components, and methods may be applied to other types of devices and other types of signals, most particularly in scenarios in which signal processing is handled by devices similarly limited in computational capability and/or power consumption. It is therefore desirable to reduce the computational complexity and concurrent power consumption incurred in managing feedback signals in such devices, regardless of the type of device or the type of signals being processed.

In embodiments of the herein disclosed apparatus, systems, and methods, an input receives a streaming signal, operative elements perform operations on the input signal and generate a streaming result signal, and an output emits the streaming result signal. As described previously, the signal emitted at the output (output signal) contributes an element (feedback) of the signal received at the input (input signal). So-called blind source separation (BSS) is combined with so-called acoustic echo cancellation (AEC) to identify and cancel the feedback component of the input signal, although as noted, the signal need not be acoustic, and need not produce an echo.

Figure 2A:
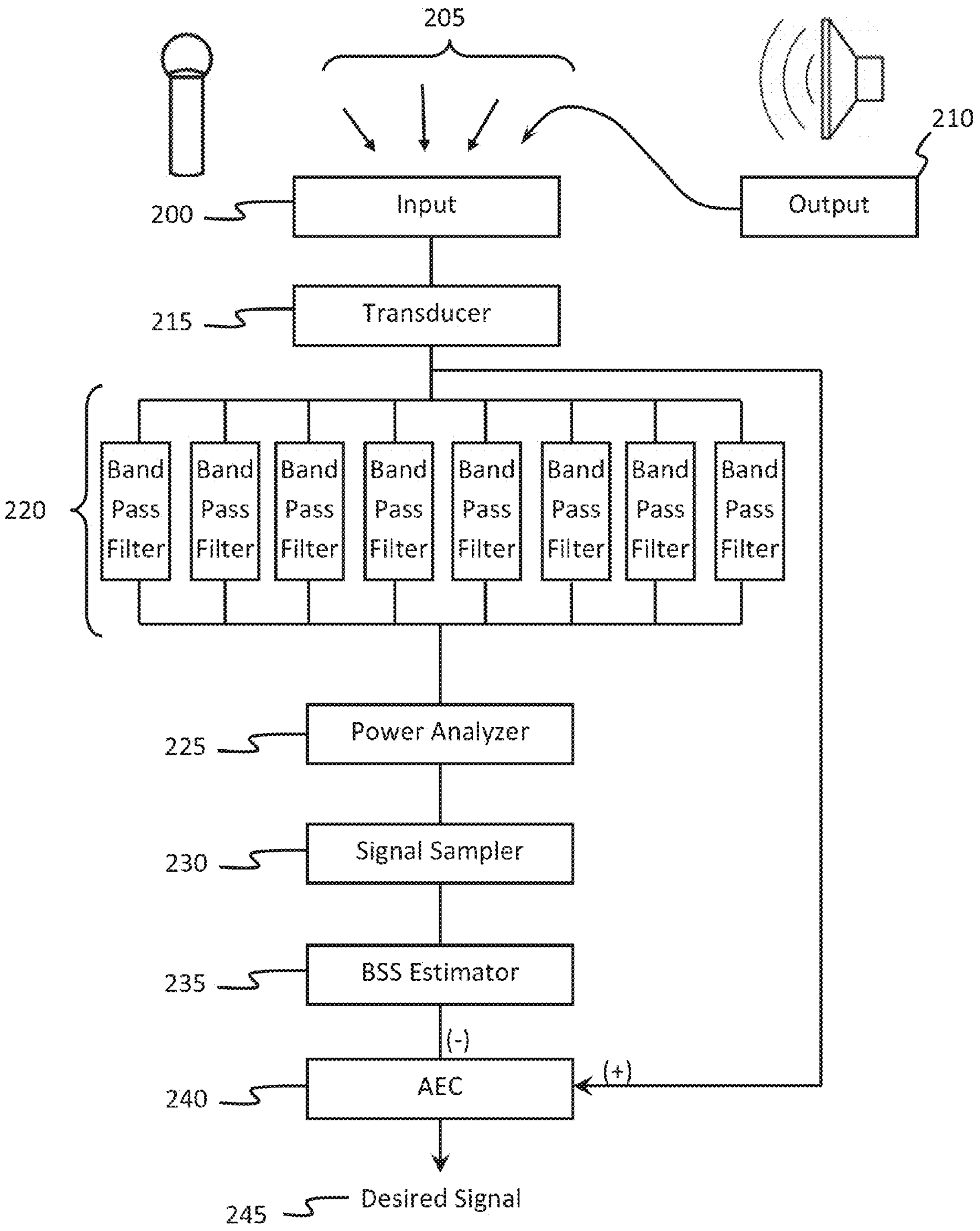
FIGS. 2A and 2B are block diagrams of exemplary embodiments of systems for canceling feedback in accordance with the disclosure.

More particularly, referring now to FIG. 2A, a block diagram is shown of an exemplary embodiment of a system for canceling feedback. An input 200, which in the case of acoustic signals may be a microphone, receives a streaming input signal 205. The input signal may comprise a plurality of input component signals as shown, including a component based on an output signal from output 210. If the input signal is not an electrical signal, as in the case of acoustic components, then the input signal may be converted into an electrical signal by transducer 215. [FIGS. 2A and 2B]

Figure 3:
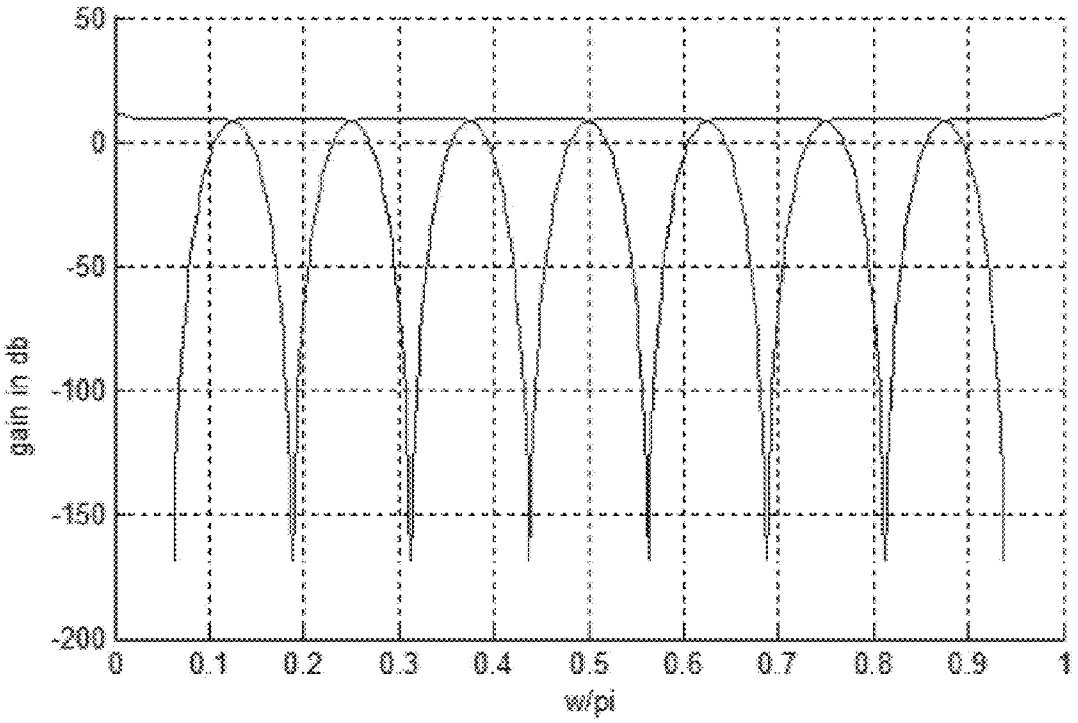
FIG. 3 illustrates the frequency response of a bank of band pass filters.

Fourier analysis has shown that virtually any kind of signal that can actually be produced (i.e., not theoretical signals) may comprise sinusoid components at a wide variety of frequencies. In the exemplary embodiment, the electrical signal is applied to a bank of band-pass filters to separate it into a plurality of frequency bands. Each band has a bandwidth that extends around a central frequency. The bands may have the same bandwidth, and the bands may be adjacent to neighboring bands. The frequency response of an exemplary bank of band pass filters is shown in FIG. 3.

Power analyzer 225 may then determine the signal power in each of the bands, and select the band having the greatest power for further analysis, discarding the other bands' signals. For the purpose of computational simplicity, the band having the greatest power is deemed to be representative of the entire input signal, or at least the part of the signal most likely to contain meaningful characteristics. In the exemplary embodiment, the input signal may be divided by eight band pass filters into eight bands, although other numbers of filters may be employed, resulting in a different number of bands. One of skill in the art would appreciate that N number of band pass filters could be used depending on the circumstances.

The selected band's signal may then be sampled at a select sampling rate by signal sampler 230, which may then select individual samples at regular intervals for further processing. For computational simplicity, the selected samples are deemed to be adequately representative of all of the samples. In the exemplary embodiment, the selected band's signal may be sampled at a rate of 8,000 samples/second, although other sampling rates may be used. In embodiments, the sampling rate may be a rate in the range of 1,000 to 64,000 samples per second. Further, in the exemplary embodiment every eighth sample is selected for further processing, although other sample selecting intervals may be used. In embodiments, a sample selection in the range of one in four to one in 64 may be used, for example. In the exemplary embodiment, a sampling rate of 8,000 per second combined with a selection of every eighth sample results in an effective sampling rate for computational purposes of only 1,000 samples/second, each sample having a width of $1/8000$ of a second. This selection of samples constitutes a sampling stream that is used for further processing.

Blind signal separator (BSS) 235 applies a BSS method to the stream of selected samples to estimate independent signal sources therein. Any BSS method may be applied that is appropriate to the computational and power capabilities of the processor. In the exemplary embodiment, the joint approximate diagonalization of eigen-matrices (JADE) algorithm is applied to the stream of selected samples, although other BSS algorithms may be used.

The BSS outputs an estimate of the signal sources contained in the stream of selected samples. For the purposes of computational simplicity, these estimated sources are deemed to be representative of the most important signal sources that are present in the original input signal.

An acoustic echo canceller (ACE) 240 may then apply an ACE method to the estimated signal sources. Any ACE method may be applied that is appropriate to the computational and power capabilities of the processor. One of the estimated signal sources may be deemed by the ACE to correspond to the signal being emitted by the output that is picked up by the input as the feedback component. To identify which one, each of the estimated signals is compared in some way by the AEC with the output signal, and the estimated signal that is most like the output signal is deemed to be representative of the feedback component.

Any type of comparison methodology may be applied that is appropriate to the computational and power capabilities of the processor. For example, a correlation-based method may be used to identify the estimated signal that is most like the output signal. Correlation methods can include calculating a correlation value, a cross-correlation value, a convolution value, or the like, for example. In the exemplary embodiment, each of the estimated signals may be convolved with the original output signal which may be obtained as nearly as possible directly from the output device. Each such convolution results in a convolution value, whose absolute value indicates its magnitude. The signal having the greatest convolution absolute value is deemed the feedback signal. The feedback signal may then be subtracted by the AEC from the input signal to cancel the feedback, producing the desired signal 245.

Figure 2B:
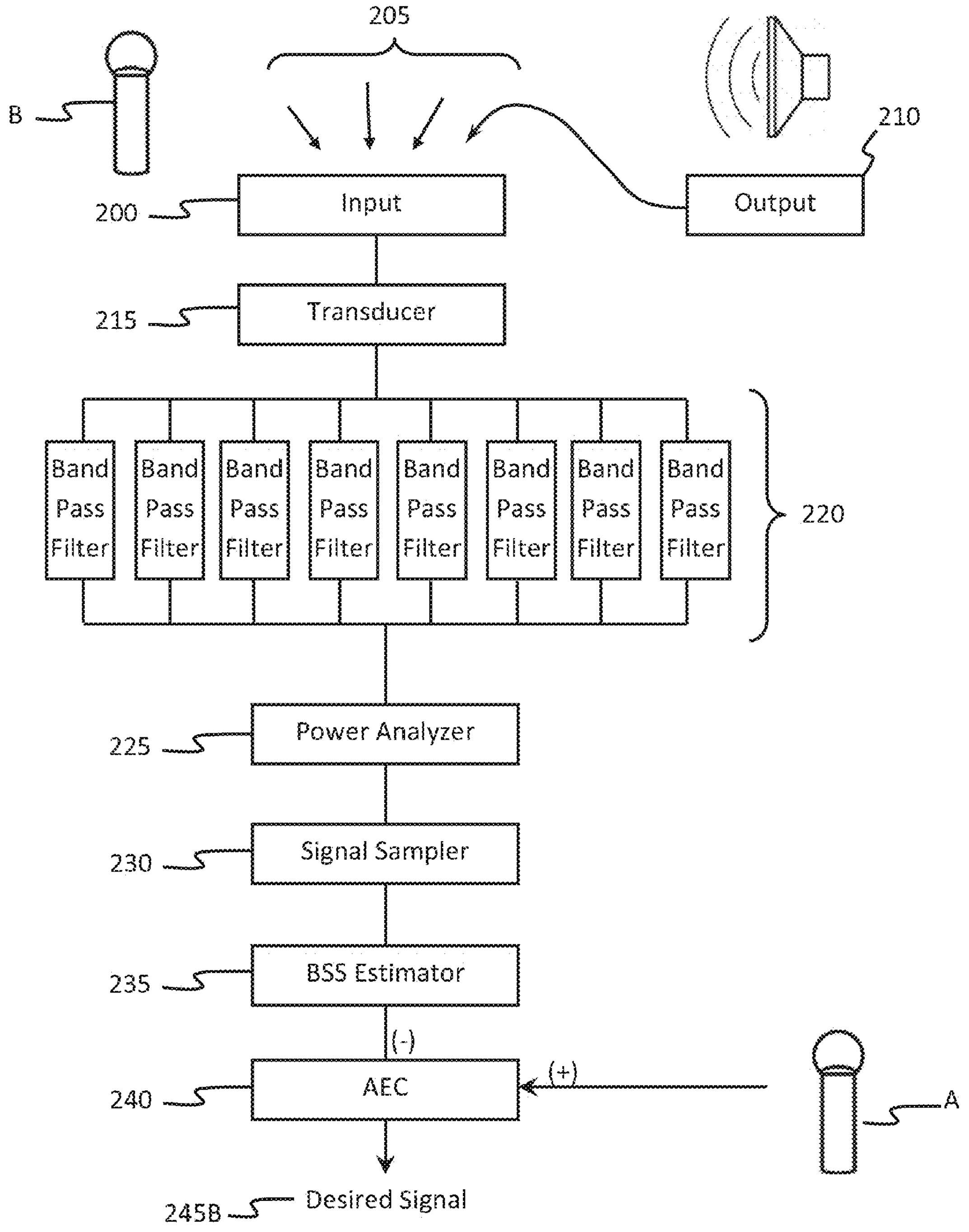

In embodiments, more than one composite input signal may be obtained to yield improved results. In an acoustic signal context, this approach corresponds to using more than one microphone, which may be oriented differently from each other to emphasize different signal sources. In an exemplary scenario, a driver in a car is speaking into a cell phone in a hands-free arrangement, for example, in which the phone is placed in a cradle and coupled to the car speakers. The phone may be equipped with two different mics, one oriented toward the driver when the phone is in the cradle, and the other oriented away from the driver and toward a surface in the car's interior, for example. FIG. 2B is illustrative of such a scenario. As shown, two mics are present, mic A (bottom right of the FIG.) and mic B (top left of the FIG.), which may be a front-facing mic and a rear-facing mic, respectively. Because the phone is coupled to the car's speakers, the car speakers emit the speech of the remote talker, i.e., the talker on the other end of the call, as the local output signal. The sound from the car speakers reverberates inside the car and enters the cell phone mics. Other noise in the environment may also be present, such as traffic noise, a conversation among passengers in the back seat, etc. Because front facing mic A is oriented toward the driver, it may emphasize the sound of the driver talking more than mic B. Rear facing mic B, which is shielded from the driver by the body of the cell phone, effectively de-emphasizes the driver's talking and may instead emphasize more than mic A the sound from the speaker reverberating off of the surface that mic B faces. In such an arrangement, the signal from the rear facing mic may be used in a BSS analysis as previously described to estimate the source of the reverberated signal as perceived at the location of the cell phone. That reverberated signal, which includes the remote talker's speech, may then be subtracted from the signal from mic A to form desired signal 245B before it is transmitted to the remote talker, thereby canceling the feedback component of the signal being transmitted that would be perceived by the remote talker as an echo.

Figure 4:
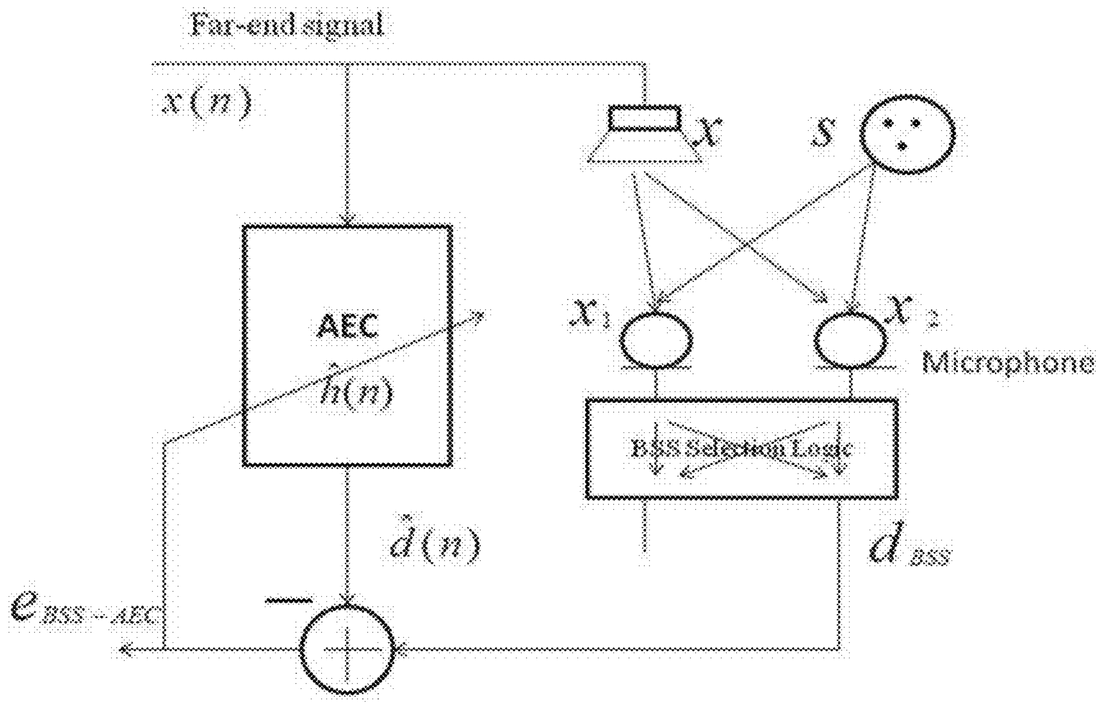
FIG. 4 is an overall block diagram for integrating BSS-AEC.

The overall block diagram for integrated BSS-AEC is shown in FIG. 4.

Figure 5:
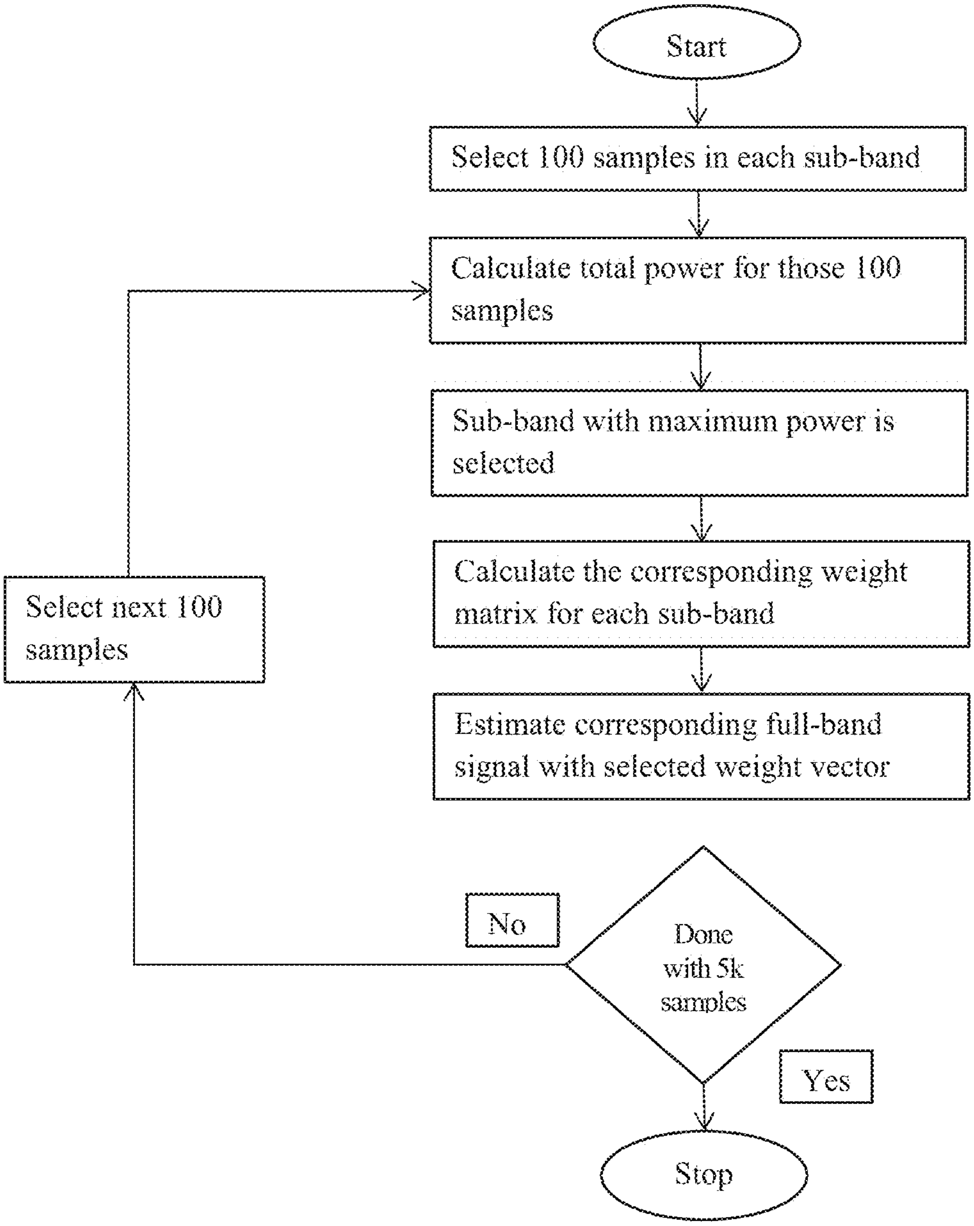
FIG. 5 is an embodiment of flowchart for subband BSS-AEC using the JADE algorithm and assuming 50,000 samples.

An example embodiment for subband BSS-AEC using JADE algorithm is shown in FIG. 5 assuming the availability of 50,000 samples. Select 100 samples in each sub-band 500; calculate total power for those 100 samples 501; sub-band with maximum power is selected 502; calculate the corresponding weight matrix for each sub-band 503; estimate corresponding full-band signal with the selected weight vector 504; no; if done with 5 k samples; stop 505, if not done, select next 100 samples 506; and repeat.

Figure 6:
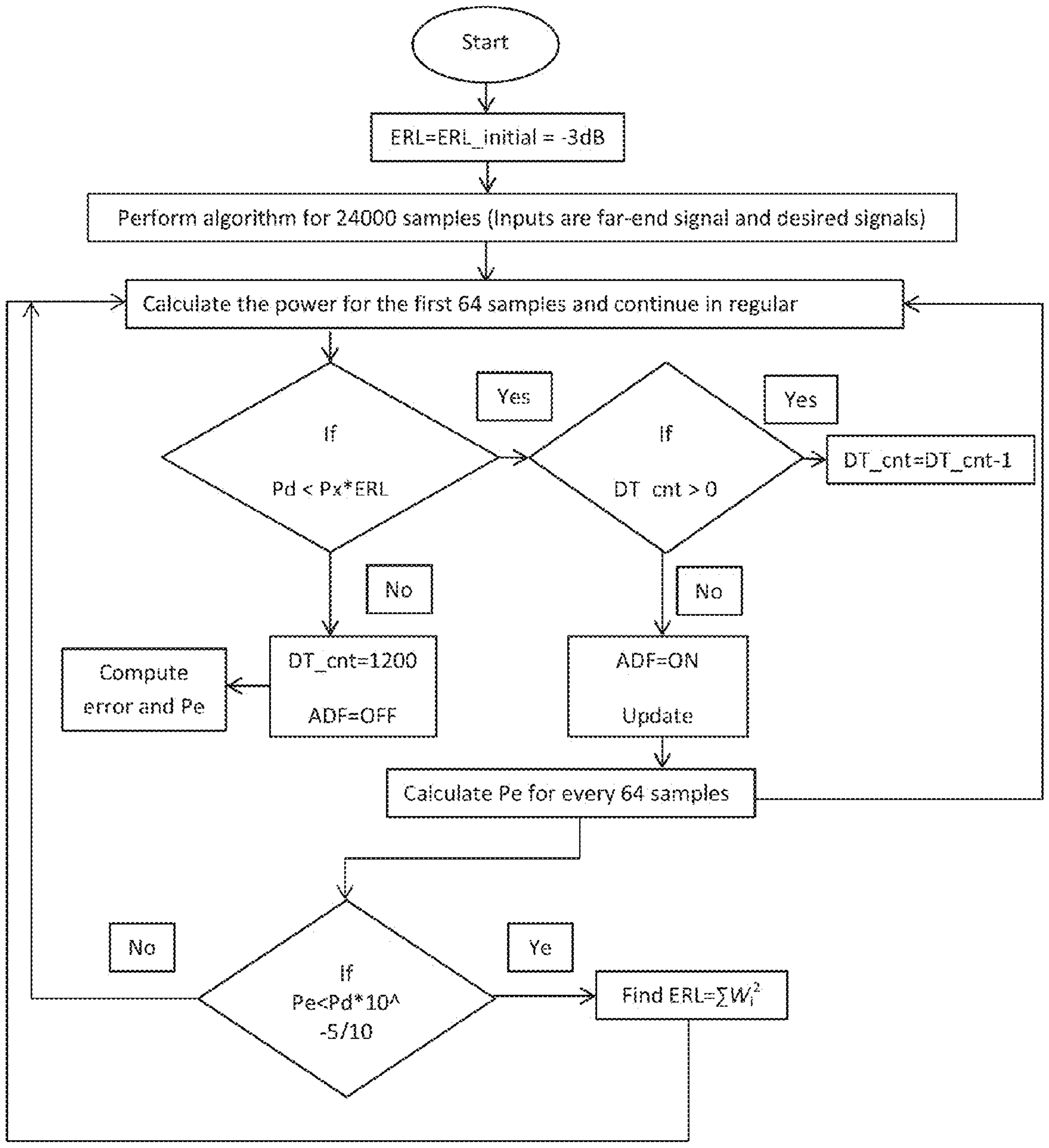
FIG. 6 is an embodiment of a double talk detection algorithm.

Because part of the AEC double talk detection is performed in order to freeze the adaptation of the AEC coefficient in the presence of a near-end talker. An example embodiment of the double talk detection algorithm is shown in FIG. 6.

Figure 7:
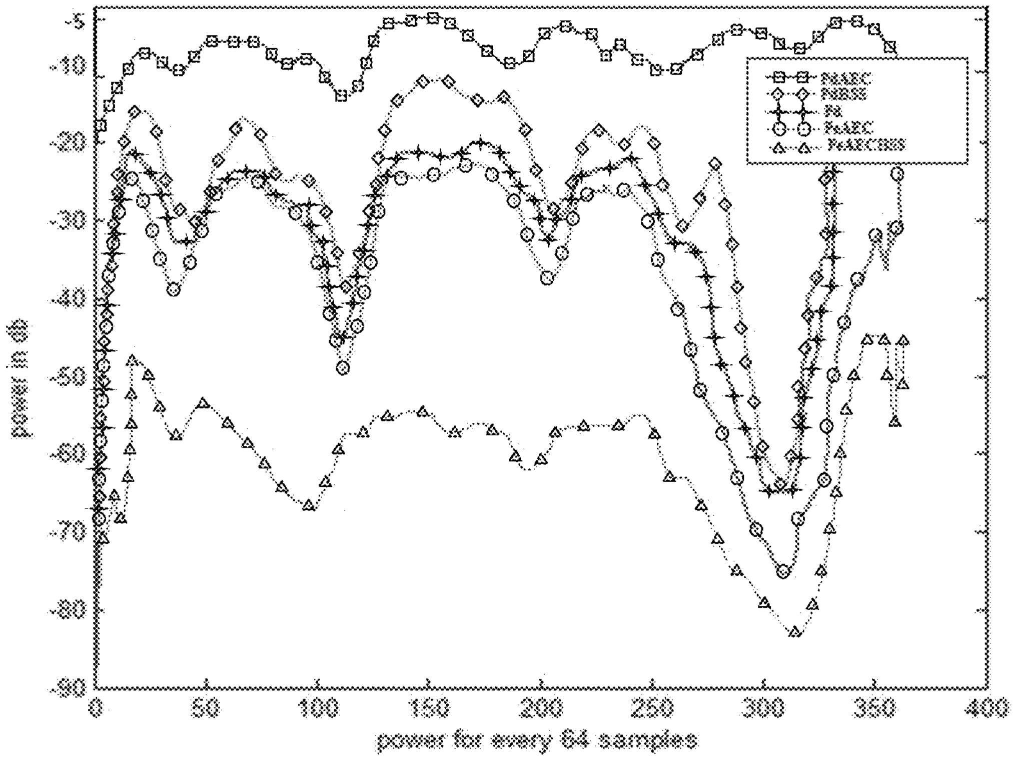
FIG. 7 is an embodiment of an integrated sub bad BSS and AEC.

The results obtained under the best embodiment of integrated subband BSS and AEC are shown in FIG. 7, where the □ curve represents power of the desired signal after AEC. The ↑ curve is the power of the desired signal after BSS, whereas the + curve is the original desired signal. The ○ curve represents power of error signal after and AEC and the Δ curve represents power of error signal after AEC-BSS. On an average, the echo is reduced by about 45 dB.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A system for performing blind signal separation, comprising:

two or more output devices operative to each emit one or more output signals;

an input device operative to receive a streaming input signal that is a composite of a plurality of component signals, wherein at least one of the component signals is based on the one or more output signals;

a plurality of band pass filters coupled to a transducer, operative to separate the input signal into a plurality of respective frequency bands;

a power analyzer coupled to the band pass filters and operative to determine the power of the input signal in each of the frequency bands and select a band in which the signal therein has the greatest power;

a signal sampler coupled to the power analyzer and operative to sample the selected band's signal at a sampling rate and select one of the samples at regular intervals;

a blind signal separator (BSS) coupled to the signal sampler and configured to implement a selected BSS algorithm to estimate one or more signal sources from the selected samples; and a feedback canceller (FC) coupled to the BSS and configured to:

compare an estimated signal of each of the estimated one or more signal sources to the output signal;

select an estimated signal most similar to the output signal; and subtract the selected estimated signal from the input signal to form a desired signal;

wherein the BSS algorithm is selected based on the computational and power capabilities of a processor of the input device.

2. The system of claim 1, wherein a transducer operative to convert the input signal into an electrical signal in the case the input signal is not an electrical signal.

3. The system of claim 1, wherein the selected estimated signal is subtracted from the input signal to form a desired signal in the case the input device is the sole input device.

4. The system of claim 1, wherein the plurality of band pass filters consists of eight band pass filters in a bank, that separates the electrical signal into eight adjacent frequency bands of the same bandwidth.

5. The system of claim 1, wherein the sampling rate of the signal sampler is in the range of about 1,000 signals per second to about 64,000 samples per second.

6. The system of claim 1, wherein the selecting one of the samples at regular intervals selects one of a plurality of signals in the range of one in four to one in 64.

7. The system of claim 1, further comprising a second input device is arranged to receive a second input signal containing at least a portion of the component signals in ratios to the second input signal different than the ratios of those component signals to the first input signal.

8. The system of claim 5, wherein the FC subtracts the selected estimated signal from a second input signal to form the desired signal.

9. A speaker/microphone containing the system of claim 1.

10. A speaker/microphone containing the system of claim 8.

11. A hearing aid containing the system of claim 1.

12. A method for performing blind signal separation to reduce feedback, the method comprising:

receiving an input signal by an input device, wherein the input signal is a composite of a plurality of component signals, and wherein at least a portion of the input signal is based on an output signal of two or more output devices;

separating the input signal into a plurality of respective frequency bands;

determining the power of the input signal in each of the frequency bands;

selecting a band in which the signal therein has the greatest power;

sampling the selected band's signal at a sampling rate by a signal sampler, selecting one of the samples at regular intervals;

estimating one or more signal sources from the selected samples by a blind signal separator (BSS);

comparing an estimated signal of the estimated signal sources to the output signal; and selecting an estimated signal most similar to the output signal; and subtracting the selected estimated signal from the input signal to form a desired signal;

wherein the BSS performs the estimating using a selected algorithm, wherein the algorithm is selected based on the computational and power capabilities of the input device.

13. The method of claim 12, where in the case the input signal is not an electrical signal, converting the input signal by a transducer into an electrical signal.

14. The method of claim 12, wherein the electrical signal is separated by a plurality of band pass filters.

15. The method of claim 12, wherein the power is determined by a plurality of band pass filters.

16. The method of claim 12, wherein the selected estimated signal is subtracted in the case the input signal is the sole input signal, subtracting the selected estimated signal from the input signal to form a desired signal.

17. The method of claim 15, wherein the plurality of band pass filters consists of eight band pass filters in a bank, that separates the electrical signal into eight adjacent frequency bands of the same bandwidth.

18. The method of claim 12, wherein the sampling rate of the signal sampler is in the range of about 1,000 signals per second to about 50,000 samples per second.

19. The method of claim 12, wherein the selecting one of the samples at regular intervals selects one of a plurality of signals in the range of one in four to one in 64.

20. The method of claim 12, further comprising receiving, at a second input device, a second input signal containing at least a portion of the component signals in ratios to the second input signal different than the ratios of those component signals to the first input signal.

21. The method of claim 12, wherein the selected estimated signal is subtracted from the second input signal to form the desired signal.

* * * * *